(12) United States Patent
Kennedy, Jr. et al.

(10) Patent No.: US 7,627,327 B2
(45) Date of Patent: Dec. 1, 2009

(54) NETWORK OVERLAY LOCATION SYSTEM AND METHOD FOR AIR INTERFACE WITH FREQUENCY HOPPING

(75) Inventors: Joseph P. Kennedy, Jr., Great Falls, VA (US); John P. Carlson, Herndon, VA (US); Thomas B. Gravely, Herndon, VA (US); Bob Brickhouse, Reston, VA (US)

(73) Assignee: Andrew LLC, Hickory, NC (US)

( * ) Notice: Subject to any disclaimer, the term of this patent is extended or adjusted under 35 U.S.C. 154(b) by 408 days.

(21) Appl. No.: 10/531,041

(22) PCT Filed: Oct. 16, 2003

(86) PCT No.: PCT/US03/32579

§ 371 (c)(1),
(2), (4) Date: Oct. 19, 2005

(87) PCT Pub. No.: WO2004/036935

PCT Pub. Date: Apr. 29, 2004

(65) Prior Publication Data

US 2006/0116130 A1 Jun. 1, 2006

Related U.S. Application Data

(60) Provisional application No. 60/418,342, filed on Oct. 16, 2002.

(51) Int. Cl.
*G06F 15/16* (2006.01)
(52) U.S. Cl. .................................. 455/456.1; 455/404.1
(58) Field of Classification Search ........................ None
See application file for complete search history.

(56) References Cited

U.S. PATENT DOCUMENTS 4,783,744 A 11/1988 Yueh (Continued)

FOREIGN PATENT DOCUMENTS

JP 60-347529 12/1994

OTHER PUBLICATIONS

Leshem, et al., "Array Calibration in the Presence of Multipath," IEEE Transactions of Signal Processing, vol. 48, No. 1, pp. 53-59, Jan. 1, 2000.

(Continued)

*Primary Examiner*—Sam Bhattacharya
(74) *Attorney, Agent, or Firm*—Duane Morris LLP

(57) ABSTRACT

Embodiments of a system and method are disclosed that enable geo-location of a mobile appliance (20) communicating over a frequency hopping air interface for a network overlay geolocation system having plural wireless location sensors (30). The wireless location sensors (30) include a radio receiver channel capable of receiving the forward channels of the air interface transmitted from the base station (10) to the mobile appliance (20). The network overlay geo-location system of the present disclosure monitors these forward channels and measures parameters that allow the geolocation system to synchronize with the hopping of the air interface on the reverse channel. The plurality of sensors measure an attribute of a signal on the reverse channel to thereby enable geo-location. Synchronization can also be reference to a stable system clock and the plurality of sensors may be tuned in reference to the system clock to enable measurement of the frequency hopping reverse channel.

29 Claims, 3 Drawing Sheets

U.S. PATENT DOCUMENTS

| | | | |
|---|---|---|---|
| 5,317,323 | A | 5/1994 | Kennedy, Jr. et al. |
| 5,465,289 | A | 11/1995 | Kennedy, Jr. et al. |
| 5,506,863 | A | 4/1996 | Meidan |
| 5,870,029 | A | 2/1999 | Otto et al. |
| 6,144,711 | A | 11/2000 | Raleigh et al. |
| 6,188,351 | B1 | 2/2001 | Bloebaum |
| 6,212,391 | B1 | 4/2001 | Saleh et al. |
| 6,295,455 | B1 | 9/2001 | Fischer et al. |
| 6,311,043 | B1 | 10/2001 | Haardt et al. |
| 6,334,059 | B1 | 12/2001 | Stilp et al. |
| 6,470,195 | B1 | 10/2002 | Meyer |
| 6,477,161 | B1 | 11/2002 | Hudson et al. |
| 6,501,955 | B1 | 12/2002 | Durrant et al. |
| 6,553,322 | B1 | 4/2003 | Ignagni |
| 6,782,264 | B2 | 8/2004 | Anderson et al. |
| 6,834,234 | B2 | 12/2004 | Scherzinger et al. |
| 6,839,539 | B2 | 1/2005 | Durrant et al. |
| 6,845,240 | B2 | 1/2005 | Carlson et al. |
| 6,922,170 | B2 | 7/2005 | Alexander, Jr. |
| 2002/0094821 | A1 | 7/2002 | Kennedy, Jr. |
| 2003/0190919 | A1 | 10/2003 | Niemenmaa |
| 2004/0040820 | A1* | 3/2004 | Adams et al. ............... 194/216 |
| 2004/0043775 | A1 | 3/2004 | Kennedy, Jr. et al. |
| 2004/0203429 | A1* | 10/2004 | Anderson et al. ........ 455/67.11 |

OTHER PUBLICATIONS

Ziskind, I., Wax, M., "Maximum likelihood localization of multiple sources by alternating projection", IEEE Trans. Acoust., Speech, Signal Process. vol. 35, No. 2 (Oct. 1988), 1553-1560.

Van Der Veen, M, Papadias, C.B., Paulraj, A.J., "Joint angle and delay estimation" IEEE Communications Letters vol. 1-1 (Jan. 1997), 12-14.

Schmidt, R.O. "Multiple emitter location and signal parameter estimation" Proc. RADC Spectrum Estimation Workshop, (Mar. 1999), 243-258.

Young-Fang Chen, Michael D. Zoltowski "Joint Angle and Delay estimation of DS-CMDA communication systems with Application to Reduced Dimension Space-time 2D Rake Receivers", IEEE Transactions on Signal Processing.

Paulraj, A.J., Papadias, C.B., "Space-Time Signal Processing for Wireless Communications", IEEE Signal Prrocessing Magazine, vol. 11 (Nov. 1997), 49-83.

Paulraj, A.J., Papadias, C.B., "Spece-Time Signal Processing for Wireless Communications: A Survey" Information System Laboratory, Stanford University.

Haardt, Brunner and Nossek Joint Estimation of 2-D Arrival Angles, Propagation Delays, and Doppler Frequencies in Wireless Communications, Proc. IEEE Digital Signal Processing Workshop, vol. 1, pp. 1-4, Bryce Canyon National Park, Utah, Aug. 1998.

M. Wax, "Position location from sensors with position uncertanty", IEEE Trans. Aero., Elect. Syst. AES-19, No. 2 (Sep. 1983), 658-662.

D.J. Torrieri. "Statistical Theory of Passive Location Systems", IEEE Trans. Aerosp. Electron. Syst. AES-20, No. 2 (Mar. 1984), 183-198.

Y.T. Chan and K.C. Ho, "A simple and efficient estimator for hyperbolic lcoation", IEEE Trans. Signal Proc. 42, No. 8 (Aug. 1994), 1905-1915.

W.H. Foy. "Position location solutions by Taylor series estimation", IEEE trans Aerosp. Electron. System AES-12, No. 2 (Mar. 1976), 187-194.

R.G. Stansfield, "Statistical theory of DF fixing", Journ. IEE 94, part IIIa (Oct. 1947), 762-770.

M.P. Wylie and J. Houtzman, "The non-line of sight problem in mobile location estimation". Proc. IEEE 5thIinternational Conf. on Universal Personal Communications, vol. 2 (Oct. 1996), 827-831.

L.Cong and W.Xuang, "Non-Line-of-Sight Error Mitigation in TDOA mobile location" Proc. IEEE Global Telecommunications conference vol. 1 (2001), 680-684.

P.C. Chen, "A non-line-of-sight error mitigation algorithm in location estimating" Proc. IEEE Conf. on wireless Communications Networking, vol. 1 (1999), 316-320.

N.J. Thomas, D.G.M. Cruickshank and D.I.Laurenson, "Performance of a TDOA-AOA hybrid mobile location system" 3G Mobile Communication Technologies Conf. Proc. 1 (Mar. 2001), 216-220.

Caffery, J., Jr., et al., "Subscriber Location in CDMA Cellular Networks," IEEE Transactions on Vehicular Technology, vol. 47, No. 2, May 1998.

Caffery, J., Jr., "A New Approach to the Geometry of TOA Location," IEEE, VTC 2000, pp. 1943-1949.

* cited by examiner

NETWORK OVERLAY LOCATION SYSTEM AND METHOD FOR AIR INTERFACE WITH FREQUENCY HOPPING

CROSS REFERENCES

The present application is co-pending with and claims priority benefit of provisional application Ser. No. 60/418,342, entitled "Geolocation of Mobile Appliances", filed on Oct. 16, 2002, the entirety of which is hereby incorporated herein by reference.

The present application is related to and concurrently filed with applications titled "A NETWORK OVERLAY GEO-LOCATION SYSTEM WITH SMART ANTENNAS AND METHOD OF OPERATION" Ser. No. #, "WIRELESS COMMUNICATION NETWORK MEASUREMENT DATA COLLECTION USING INFRASTRUCTURE OVERLAY-BASED HANDSET LOCATION SYSTEMS" Ser. No. #, "A SYSTEM AND METHOD FOR ESTIMATING THE MULTI-PATH DELAYS IN A SIGNAL USING A SPATIALLY BLIND ANTENNA ARRAY" Ser. No. #; "A SYSTEM AND METHOD FOR ENHANCING THE ACCURACY OF A LOCATION ESTIMATE, Ser. No. #; and "SYSTEM AND METHOD FOR OPERATING A NETWORK OVERLAY GEO-LOCATION SYSTEM WITH REPEATERS" Ser. No. #, filed Oct. 16, 2003, the entirety of each of these applications is incorporated herein by reference.

BACKGROUND

This disclosure is directed to a wireless communications network overlay for determining the location of mobile appliances.

The use of wireless communication devices such as telephones, pagers, personal digital assistants, laptop computers, etc., hereinafter referred to collectively as "mobile appliances", has become prevalent in today's society. Recently, at the urging of public safety groups and others, there has been increased interest in technology which can determine the geographic position, or "geo-locate" a mobile appliance in certain circumstances. For example, the Federal Communication Commission (FCC) has issued a geo-location mandate for providers of wireless telephone communication services that puts in place a schedule and an accuracy standard under which the providers of wireless communications must implement geo-location technology for wireless telephones when used to make a 911 emergency telephone call (FCC 94-102 E911).

In addition to E911 emergency related issues, wireless telecommunications providers are developing location-enabled services for their subscribers including roadside assistance, turn-by-turn driving directions, concierge services, location-specific billing rates and location-specific advertising.

In a network-based geo-location system, the mobile appliance to be located is typically identified and radio channel assignments determined by (a) monitoring the control information transmitted on a radio channel or a wireline interface within the wireless network for telephone calls being placed by a mobile appliance to thereby detect calls of interest, e.g., 911 calls, or (b) a location request provided by a non-mobile appliance source, e.g., an enhanced services provider. Once a mobile appliance to be located has been identified and radio channel assignments determined, the geo-location determining system is first tasked to determine the geo-location of the mobile appliance and then directed to report the determined position to the requesting entity or enhanced services provider.

The monitoring of the RF transmissions from the mobile appliance or from a wireline interface to identify calls of interest is known as "tipping" and generally involves recognizing a call of interest being made from a mobile appliance and collecting the call setup information. Once the mobile appliance is identified and the call setup information is collected, the location determining system can be tasked to geo-locate the mobile appliance.

FIG. 1 shows a conventional mobile-appliance communication system having a mobile switch controller 45 connected to base stations 10 for communicating with a mobile appliance 20. Each base station 10 contains signal processing equipment and an antenna for transmitting to and receiving signals from the mobile appliance as well as other base stations and centrally located control and processing stations. A mobile appliance location determining sensor 30, sometimes referred to as a wireless location sensor ("WLS"), may be positioned at some or all of the base stations 10 to determine the location of a mobile appliance within the signal coverage area of the communication system. The antenna may be a multi-element antenna. The Mobile Positioning Center 40 (MPC) generally tasks the location system to locate a mobile appliance, and supplies channel assignment information to the location system via the GCS 50.

A network overlay system is generally composed of two main components, one component which resides at the base station that makes measurements on an RF signal emanating from a wireless device, known in the art as a geo-location sensor or a wireless location sensor ("WLS") 30, and the other component which resides at a mobile switch that tasks the geo-location sensor groups to collect data and then uses the data to compute a location estimate. This component is generally referred to as the Geo-location Control System 50 ("GCS").

As discussed above, one way to initiate a geo-location evolution is for an outside entity to task the GCS to generate a location estimate on a particular (target) mobile appliance. The tasking may be accompanied by information on the mobile of interest including the serving base station and sector for the call as well as the RF channel being used by the wireless communications network to complete the wireless connection. Typical examples of information that must be known include the RF frequency especially where Frequency Division Multiple Access ("FDMA") is used, the time slot of the transmission for Time Division Multiple Access ("TDMA") systems, and the spreading code for Code Division Multiple Access ("CDMA") systems. In general, this information is used to tune the radio receivers of the WLSs so that measurements related to the geo-location estimation can be made. Once the GCS receives the geo-location tasking, the GCS tasks a set of WLS units to take measurements of the RF emission of the target mobile. The WLS units take the measurements and report the data from the measurements to the GCS. The GCS then computes a location estimate using a mathematical or data matching algorithm, as is well known in the art.

Alternatively, a geo-location evolution may commence upon detection of a call of interest, such as a 911 call. In this scenario, control channels used to set up calls in the wireless network can be scanned to detect the placement of a call of interest. The signaling that occurs on the control channel can be used to determine location if the control data is contained on an RF channel, or alternatively the RF traffic channel parameters can be extracted from the control channel messaging to determine which traffic channel to use for geo-location related measurements.

In operation, these network overlay location systems typically take measurements on RF transmissions from mobile appliances at base station locations surrounding the mobile appliance and estimate the location of the mobile appliance with respect to the base stations. Because the geographic location of the base stations is known, the determination of the location of the mobile appliance with respect to the base station permits the geographic location of the mobile appliance to be determined. The RF measurements of the transmitted signal at the base stations may include the time of arrival ("TOA"), time difference of arrival ("TDOA"), the angle of arrival ("AOA"), the frequency difference of arrival ("FDOA"), the signal power, or the unique/repeatable radio propagation path (radio fingerprinting) derivable features. In addition, the geo-location systems can also use collateral information, e.g., information other than that derived for the RF measurement to assist in the geo-location of the mobile appliance. Such collateral information may include the location of roads, dead-reckoning, topography, map matching etc.

Network overlay location systems typically locate a mobile appliance on the traffic channels of a wireless network. Network overlay systems typically use sensors employing techniques of TDOA supplemented with AOA to perform a multi-site location computation. The traffic channel assignment information is provided through a separate process, with one option being a wire line interface 41 (see FIG. 1) providing MOBINFO (IS-41 mobile information) parameters passed by the Mobile Positioning Center ("MPC") 40 as part of the GPOSREQ (J-STD-036 Geolocation Position Request) message.

In general, the overlay system tunes radio receivers of the WLS to an RF channel occupied by the mobile appliance of interest to make these measurements. As noted above, information about the channel must be known for the radio receivers in the sensors to be tuned. One class of air interfaces that cannot be located with the previously defined information used in the prior art are frequency hopping interfaces. Frequency hopping signals change RF frequency rapidly over time. For example a frequency sequence $\vec{f}$ is comprised of a sequence of N different frequencies $\vec{f} = (f_0, f_1, f_2, f_3 \ldots f_{N-1})$ with each hop typically having a duration T. Frequency hopping, as is well known in the art, is used in mobile radio applications to mitigate the effects of stationary interference or multi-path that may exist if the transmission is on a certain RF frequency. By rapidly changing frequencies, the probability of prolonged interference or fading due to multi-path is reduced.

In general the hopping sequences and duration of each hop are deterministic and known by both the mobile appliance and the serving base station. However, even if the hopping sequence is known, the radio receivers in the geo-location system cannot know where in the sequence to look for the mobile appliance signal, and location estimates determined from measurements made without this information can be made on the wrong mobile appliance since a signal from other than the target mobile appliance may hop into the RF channel being measured.

In communications between the base station and mobile appliance, the mobile's frequency hopping transmission on the reverse channel will be synchronized in some manner to the forward channel transmission as is known in the prior art. This synchronization is achieved for some air interfaces by having the mobile appliance use the reception and timing of broadcast control frames from the base station to establish a timing grid for hopping its transmission RF frequency. By having the timing grid, and being told what hopping pattern to use including the first RF frequency in the pattern, the base station and mobile appliance can know what frequency each will transmit on in time. Further refinement of the hopping timing is done by having the base station advance transmission in time to compensate for range uncertainties from the base station. This is accomplished by having the base station send timing advance (TA) control data to the mobile on forward transmission channels while during the course of traffic transmission. This synchronization between the forward (typically taken to be from the base station to the mobile appliance) and reverse (typically taken to be from the mobile appliance to the base station) channels is required for mobile appliance and base station communications. The forward channel transmission may or may not be synchronized to any other reference at the serving base station or another base station. When it is synchronized, sources of synchronization include GPS time, and timing derived from communications facilities used by the base station such as T1 or E1 timing.

The subject matter of the present disclosure obviates the deficiencies in the prior art by providing a system and method for the radio receivers of the wireless location sensors to be tuned to follow the hopping sequence to facilitate measurement of a signal from a target mobile appliance that is using a frequency hopping air interface.

It is an object of the disclosure to present a novel system and method for geo-locating a frequency hopping mobile appliance. The novel system and method may monitor communication between a base station and a target mobile appliance on a forward channel, retrieve synchronization information from the forward channel; and synchronize the wireless location sensors with the mobile appliance on the reverse channel. The measurements of the location system may be made by a sensor located at one base station or other site on the forward and reverse transmissions from wireless communications system equipment co-located at that site, or from wireless communications equipment transmissions located at neighbor sites. Thus timing synchronization and other information necessary to follow frequency hopping patterns on forward and reverse transmissions can be accomplished without having location system sensors at each wireless communications system base station site. The system and method may also include measuring an attribute of the mobile appliance's signal to thereby generate an estimate of the geo-location of the mobile appliance based at least in part upon the measured attribute.

In is also an object of the disclosure to present a novel improved method for geo-location of a wireless appliance including the steps of retrieving channel assignment information from an MPC or by monitoring an RF or wireline link for channel assignment information, monitoring the reverse channel at a plurality of sensors for the wireless appliance's signal, measuring an attribute of the signal at the plurality of sensors, and determining the location of the wireless appliance from the measured attributes. The improved method may also include monitoring a forward link of the mobile appliance and retrieving synchronization information from the forward link to thus enable measuring an attribute of the signal and for geo-locating the mobile appliance.

It is still another object of the disclosure to present, in a wireless communication system communicating with a frequency hopping mobile appliance with a determinable hopping frequency and duration, a novel network overlay geo-location system for geo-locating the mobile appliance. The geo-location system may include a plurality of sensors located at the plural base stations for measuring an attribute of a reverse communication channel, a geo-location system controller operably connected to each of the plurality of sensors, and an information channel for transmitting information regarding the mobile appliance's frequency hopping characteristics to the plural wireless location sensors. In the system, the forward channel may contain synchronization information for tuning the plurality of sensors to the reverse communication channel, thus allowing the sensors to collect measurements to geo-locate the mobile appliance.

It is another object of the disclosure to present a novel method for geo-location of the wireless appliance including the steps of monitoring the forward channel for synchronization information and using the synchronization information to tune the plurality of sensors to the reverse channel.

These and other advantages of the disclosed subject matter over the prior art will be readily apparent to one skilled in the art to which the disclosure pertains from a perusal or the claims, the appended drawings, and the following detailed description of the preferred embodiments.

DETAILED DESCRIPTION

Figure 1:
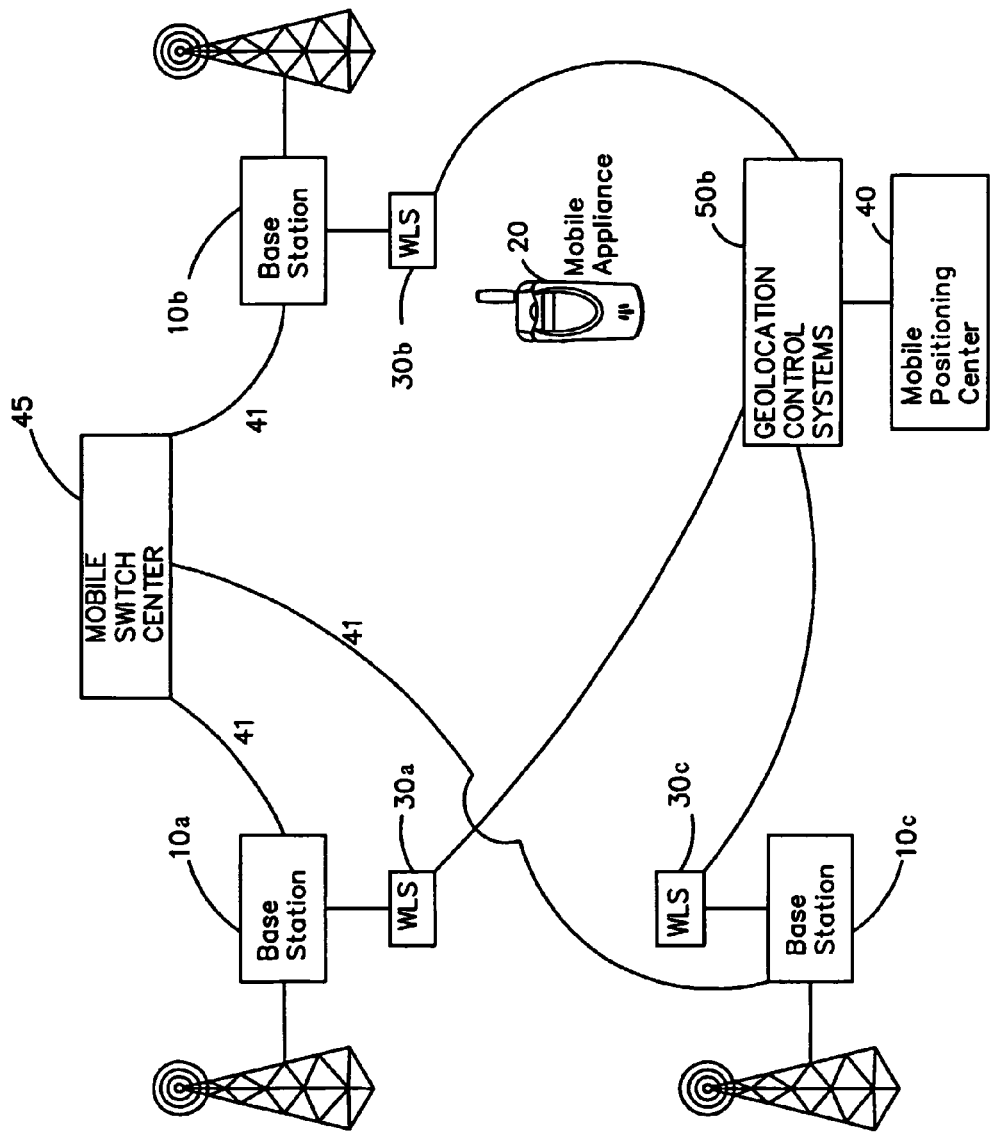
FIG. 1 is an illustration of a standard network overlay geo-location system with a host wireless communication system.

To enable geo-location of a mobile appliance communicating over a frequency hopping air interface, the radio receivers of the WLSs must be synchronized with the reverse channel. To accomplish this, a radio receiver channel is created in the network overlay equipment that is capable of receiving the forward channels of the air interface transmitted from the base station to the mobile appliance. The radio receiver channel can be dedicated or a shared resource. The radio receiver channel will preferably be employed at each base station and/or WLS. Network overlay geo-location systems in the prior art do not receive these forward channels as they do not provide any direct source of measurement data from which to estimate the location of the mobile appliance. The network overlay location system of the present disclosure monitors these forward channels to measure parameters that allow the geo-location system to synchronize with the hopping of the air interface, in the same manner that facilitates communication between a mobile appliance and a base station. These parameters may include, but are not limited to, the phase of the hopping cycle (i.e., the points in time when the mobile's RF transmission changes frequency) and the location in the sequence of hopping frequencies where the reverse channel is currently operating, sometimes referred to as hopping sequence position. These parameters can be obtained from the Hopping Sequence Number (HSN) with references which algorithm to use to choose a frequency in the list of allowable frequencies for any given frame, the Mobile Allocation list (MA) which is the list of frequencies that can be hopped to, and the Mobile Allocation Index Offset (MAIO) which is a list of assigned offset into the MA list that sets which frequency the hopping starts with for each mobile.

Measurements of the forward channel parameters coupled with known information about the hopping sequence, such as the duration of the hops, the sequence of hopping frequencies and the particular synchronization of the reverse channel hopping sequence to the forward channel hopping sequence, allow the WLSs in the network overlay location system to receive the reverse channel transmitted from the mobile appliance, remain in synchronization with each frequency hop of the reverse channel, and thereby perform geo-location measurements of the mobile appliance. This is possible since the hopping sequence of the forward channel is synchronized with the hopping sequence of the reverse channel in a known fashion. Furthermore, the hopping sequence of the forward channel may or may not be synchronized to any reference at the base station or any other base station. Therefore, in order to obtain the hopping sequence of the forward channel, transmitted signals on the forward channel must be received and information gathered from there as described herein.

It may also be advantageous to maintain synchronization with the reverse channel hopping signal without constantly monitoring the forward channels. This can be accomplished by referencing the determined hopping phase and position in the sequence to a stable time base available within the network overlay location system or within the wireless communication system. An embodiment may use Global Positioning System ("GPS") time for this purpose. Currently, most GSM base stations are not synchronized to each other, so the radio receiver channel is required to measure the forward channels for each base station providing service to mobile appliances. If the base stations are synchronized, this would not be required, and fewer measurements could be made. Without base station synchronization or common reference usage, and network overlay equipment using a common reference, measurement devices at different base stations can make measurement on a mobile appliance even if only one of the measurement devices has synchronized to the forward channel associated with the base station serving the mobile appliance.

The parameters measured from the forward channel to detect hopping phase and position in the sequence may include specific information transmitted as control information or may be transmission related parameters.

Figure 2:
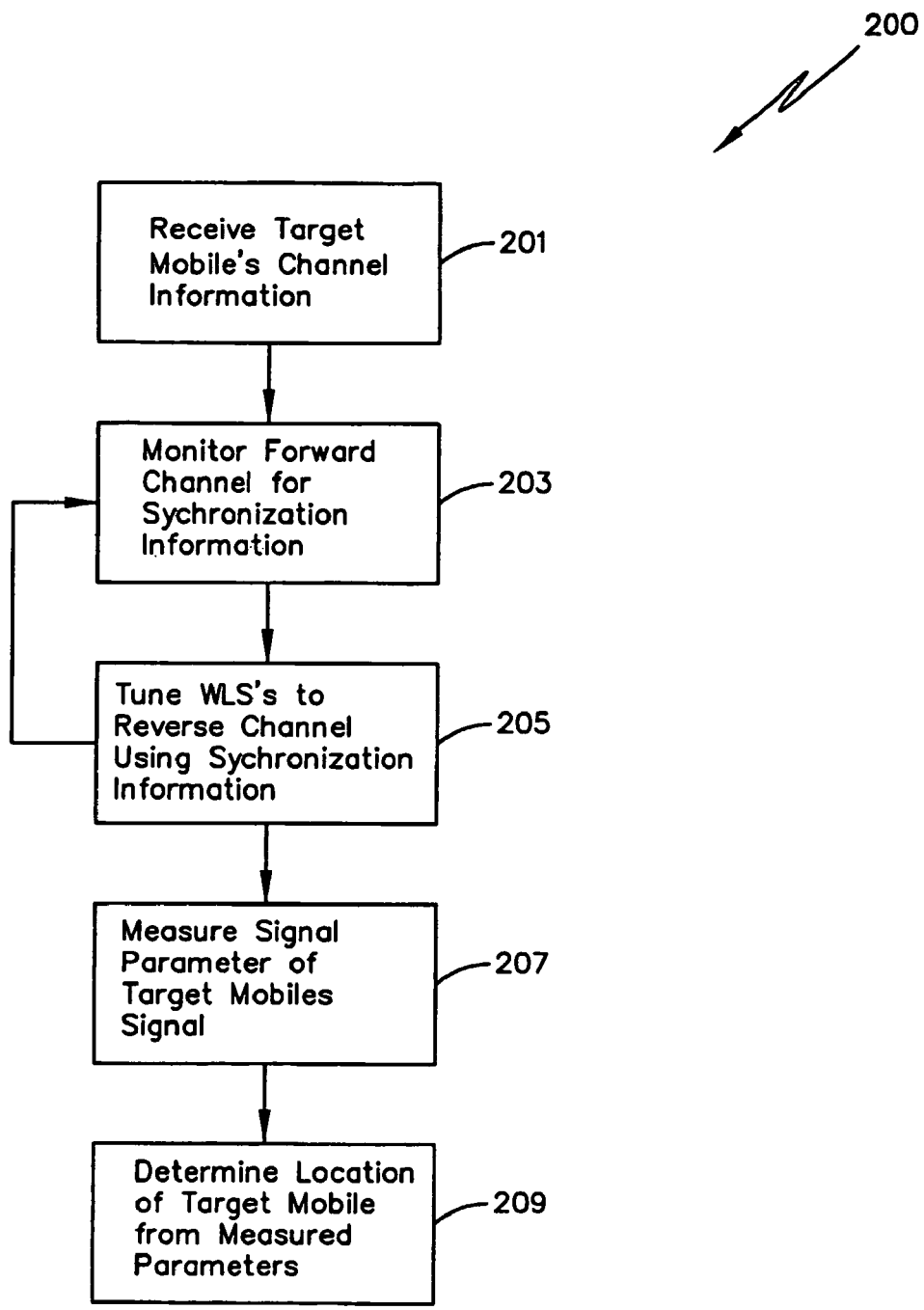
FIG. 2 is a flow chart illustrating an embodiment of the disclosed subject matter.

FIG. 2 shows a representative flow chart for an embodiment to enable geo-location of mobile appliances employing frequency hopping communication scheme 200.

In block 201 the GCS receives tipping information including the target mobile's channel information. This information may include hopping sequence and hop duration. The geo-location system monitors the forward channel from the serving base station to the target mobile in order to extract synchronization information in block 203. This step may take place in sequence, or occur prior to or in parallel with other steps in the process. The GCS then tasks WLSs proximate to the target mobile's serving sector to tune to the target mobile's reverse channel in block 205. As discussed above, tuning to the reverse channel may include using the synchronization information retrieved from the forward channel, the hopping sequence, and the hop duration. Monitoring the forward channel and tuning the WLS to the reverse channel may be accomplished continuously in order to maintain synch. It is also contemplated that once the synchronization information is taken from the forward channel, continuous monitoring, or any monitoring, of the forward channel may no longer be necessary or desired. The WLS then measures a parameter of the target mobile's signal in block 207. The measurements are provided to the GCS to determine a geo-location estimate for the target mobile using the measured parameters as shown in block 209.

Figure 3:
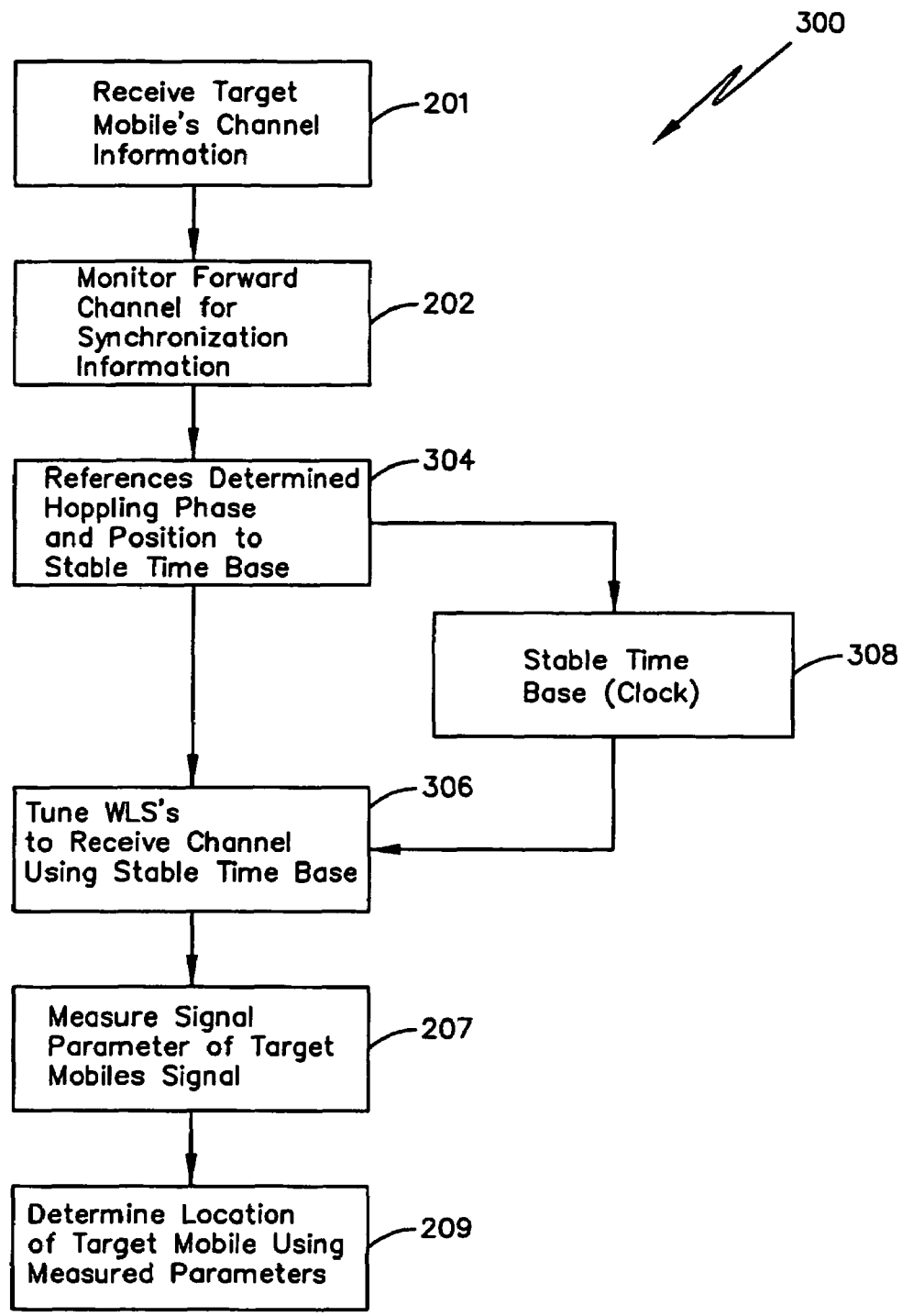
FIG. 3 is a flow chart illustrating an additional embodiment of the disclose subject matter.

Alternatively as shown in FIG. 3, is a method 300 where the hopping phase and position in the sequence can be referenced to a stable time base such as, but not limited to, a GPS clock maintained by the system. In this method the GCS receives tipping information including the target mobile's channel information in block 201. The geo-location system monitors the forward channel from the serving base station to the target mobile in order to extract synchronization information in block 202. The GCS system then references the determined hopping phase and position in the sequence to the system clock in block 304. The GCS then tasks WLSs proximate to the target mobile's serving sector to tune to the mobile's reverse channel using the system clock 308 in block 306. The system clock being one or both of the network overlay clock and the GSM clock. Since the position and phase of the hopping sequence are referenced to the system clock, monitoring the forward channel is no longer required to maintain synch. The WLSs then measure a parameter of the target mobile's signal in block 207. The measurements are provided to the GCS to determine a geo-location estimate for the target mobile using the measured parameters as shown in block 209.

While preferred embodiments of the present invention have been described, it is to be understood that the embodiments described are illustrative only and the scope of the invention is to be defined solely by the appended claims when accorded a full range of equivalents, many variations and modifications naturally occurring to those skilled in the art from a perusal hereof.

What we claim is:

1. A method for generating an estimate of the geo-location of a frequency hopping mobile appliance operating within a wireless communication system with a plurality of base stations and having a network overlay geo-location system with a plurality of wireless location sensors, comprising the steps of:
   monitoring at the wireless location sensors a signal on a forward channel between one of the plurality of base stations and the mobile appliance;
   retrieving at said wireless location sensors synchronization information from the forward channel;
   synchronizing a property of said wireless location sensors with a reverse channel between the mobile appliance and the base station as a function of the synchronization information from the forward channel to thereby receive at said wireless location sensors a signal on the reverse channel;
   measuring at said wireless location sensors an attribute of the reverse channel signal; and,
   generating an estimate of the geo-location of the mobile appliance based in part upon the measured attribute.

2. The method of claim 1 wherein the step of monitoring is accomplished by a dedicated receiver at said wireless location sensors.

3. The method of claim 1 further comprising the step of receiving in said wireless location system channel assignment information including hopping sequence.

4. The method of claim 1 wherein the synchronization information comprises hopping sequence position.

5. The method of claim 1 wherein the synchronization information comprises hopping sequence phase information.

6. The method of claim 1 further comprising the step of referencing the synchronization information with a network overlay clock.

7. The method of claim 6 further comprising the step of changing the monitoring frequency of the plurality of wireless location sensors based at least in part on the network overlay clock.

8. The method of claim 6 further comprising the step of changing the monitoring frequency of the plurality of wireless location sensors based at least in part on a GSM system clock.

9. The method of claim 1 wherein the plurality of wireless location sensors change monitoring frequency based in part on the synchronization information.

10. The method of claim 1, wherein the property of said wireless location sensor is selected from the group consisting of hopping sequence, hopping sequence position, hopping sequence phase and monitoring frequency.

11. In a method for geo-locating a mobile appliance comprising the steps of retrieving channel assignment information from a geolocation control system, monitoring a reverse channel at a plurality of sensors for a signal from the mobile appliance, measuring an attribute of the reverse channel signal at the plurality of sensors, and determining the location of the wireless appliance from the measured reverse channel signal attributes,
   the improvement comprising the steps of:
   monitoring a signal in the forward channel to the mobile appliance;
   retrieving synchronization information from the forward channel signal;
   determining synchronization information for the reverse channel from the synchronization information retrieved from the forward channel;
   monitoring the reverse channel as a function of the determined synchronization information; and,
   measuring an attribute of a signal in the reverse channel from the mobile appliance to thereby geo-locate the mobile appliance.

12. The method of claim 11 wherein the forward channel is a frequency hopping channel.

13. The method of claim 12 wherein the reverse channel is a frequency hopping channel.

14. The method of claim 13 including the step of receiving channel assignment information including hopping sequence and hop duration.

15. The method of claim 13 wherein the synchronization information for the reverse channel comprises hopping sequence position.

16. The method of claim 13 wherein the synchronization information for the reverse channel comprises phase information.

17. The method of claim 13 further comprising the step of referencing the synchronization information with a network overlay clock.

18. The method of claim 17 further comprising the step of changing the monitoring frequency of the plurality of sensors based on the network overlay clock.

19. The method of claim 13 wherein the plurality of sensors change monitoring frequency based in part on the synchronization information.

20. A system for generating an estimate of the geo-location of a frequency hopping mobile appliance operating within a wireless communication system with a plurality of base stations and having a network overlay geo-location system, comprising:
   plural wireless location sensors for:
      monitoring a signal on a forward channel between one of said plurality of base stations and the mobile appliance;
      retrieving synchronization information from said forward channel;
      synchronizing a property of the plural wireless location sensors with a reverse channel between the mobile appliance and the base station as a function of the synchronization information from the forward channel to thereby receive a signal on the reverse channel; and measuring an attribute of the reverse channel signal;

a geolocation control system operably connected to each of said plural wireless location sensors for generating an estimate of the geo-location of the mobile appliance based in part upon the measured attribute from said plural wireless location sensors.

21. The system of claim 20 further comprising circuitry for providing a stable time reference.

22. The system of claim 21 wherein said circuitry is operably connected to each of said plurality of sensors.

23. The system of claim 22 wherein said plurality of sensors are tuned to the reverse communication channel between the mobile appliance and one of the plural base station using said stable time reference.

24. The system of claim 21 wherein said circuitry is a global positioning system clock.

25. The method of claim 20, wherein the property of said wireless location sensor is selected from the group consisting of hopping sequence, hopping sequence position, hopping sequence phase and monitoring frequency.

26. A method of geo-location of the wireless appliance in a wireless communication system with plural base stations and a network overlay geo-location system with a plurality of sensors comprising the steps of:

communicating from one of the plural base stations to the wireless appliance over a forward channel;

communication from the wireless appliance to the one of the plural base stations over a reverse channel;

monitoring the forward channel for synchronization information;

and tuning a property of the plurality of sensors to the reverse channel with the synchronization information;

wherein the reverse channel is a frequency hopping channel and the forward channel contains information to synchronize a property of the base station with the hopping sequence of the mobile appliance over the reverse channel.

27. The method of claim 26 further comprising the step of referencing the synchronization information to a system clock.

28. The method of claim 27 wherein the plurality of sensors are tuned to the reverse channel using the system clock.

29. The method of claim 28 wherein the system clock is a global positioning system clock.

* * * * *